(12) United States Patent  (10) Patent No.: US 8,194,347 B2
Hendriks et al.  (45) Date of Patent: Jun. 5, 2012

(54) DESIGNED ROUGHNESS AND SURFACE TREATMENTS FOR CAPILLARY BUFFER OF FLUID DYNAMIC BEARINGS

(75) Inventors: Ferdinand Hendriks, Morgan Hill, CA (US); Fu-Ying Huang, San Jose, CA (US); Chiaoping Ku, Fremont, CA (US); Jifang Tian, Fremont, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 846 days.

(21) Appl. No.: 11/897,712

(22) Filed: Aug. 30, 2007

(65) Prior Publication Data

US 2009/0063764 A1  Mar. 5, 2009

(51) Int. Cl.
  *F16C 32/06* (2006.01)
  *G11B 17/02* (2006.01)
  *F16C 33/74* (2006.01)

(52) U.S. Cl. ............... 360/99.08; 360/98.07; 384/119; 384/118; 384/120; 384/132

(58) Field of Classification Search ............ 360/99.08, 360/98.07; 384/100, 107, 112, 114, 120, 384/118, 119, 132
  See application file for complete search history.

(56) References Cited

U.S. PATENT DOCUMENTS

| | | | |
|---|---|---|---|
| 5,667,309 A * | 9/1997 | Nose | 384/132 |
| 5,683,183 A | 11/1997 | Tanaka et al. | |
| 6,074,098 A | 6/2000 | Asai et al. | |
| 6,126,320 A | 10/2000 | Ichiyama | |
| 6,307,291 B1 | 10/2001 | Iwaki et al. | |
| 6,672,766 B2 | 1/2004 | Nottingham et al. | |
| 6,787,954 B2 * | 9/2004 | Yoshitsugu et al. | 310/90 |
| 6,836,040 B2 * | 12/2004 | Watanabe et al. | 310/90 |
| 6,860,636 B2 * | 3/2005 | Takahashi | 384/119 |
| 7,001,074 B2 * | 2/2006 | Dittmer et al. | 384/107 |
| 7,011,450 B2 * | 3/2006 | Kusaka et al. | 384/107 |
| 7,153,028 B2 | 12/2006 | Oelsch | |
| 7,210,850 B2 | 5/2007 | Kusaka et | |
| 7,234,868 B2 * | 6/2007 | Tiller et al. | 384/107 |
| 7,510,330 B2 * | 3/2009 | Obara | 384/119 |
| 2002/0037116 A1 | 3/2002 | Nishida et al. | |
| 2003/0113046 A1 * | 6/2003 | Takahashi | 384/119 |
| 2004/0005101 A1 * | 1/2004 | Grantz | 384/110 |
| 2004/0161182 A1 * | 8/2004 | Kusaka et al. | 384/107 |
| 2004/0223673 A1 * | 11/2004 | Tiller et al. | 384/107 |
| 2005/0088779 A1 | 4/2005 | Gomyo et al. | |
| 2005/0111766 A1 * | 5/2005 | Gotoh et al. | 384/100 |
| 2005/0274018 A1 | 12/2005 | Gomyo et al. | |
| 2006/0010682 A1 * | 1/2006 | Fujii et al. | 29/596 |

(Continued)

FOREIGN PATENT DOCUMENTS

EP  0922871  6/1999

(Continued)

OTHER PUBLICATIONS

Hendriks, et al., "Dynamics of the Oil-Air Interface in Hard Disk Drive Bearings", *IEEE Transactions on Magnetics*, vol. 41, No. 10, Oct. 2005, 2884-2886.

(Continued)

*Primary Examiner* — Will J Klimowicz

(57) ABSTRACT

A contoured region is disposed within a capillary buffer of a Fluid Dynamic Bearing. In one embodiment, the contoured region comprises at least one defined edge for arresting the displacement of a lubricant within the capillary buffer.

15 Claims, 11 Drawing Sheets

U.S. PATENT DOCUMENTS

| | | |
|---|---|---|
| 2006/0051001 A1 | 3/2006 | Nishimura et al. |
| 2007/0047857 A1* | 3/2007 | Hamada et al. ............... 384/100 |
| 2008/0063332 A1* | 3/2008 | Yamamoto et al. ........... 384/480 |

FOREIGN PATENT DOCUMENTS

| | | | |
|---|---|---|---|
| EP | 0851134 | | 4/2003 |
| JP | 08320015 | A * | 12/1996 |
| JP | 10073126 | A * | 3/1998 |
| JP | 2000056252 | A * | 2/2000 |
| JP | 2000121986 | A * | 4/2000 |
| JP | 2000155284 | A * | 6/2000 |
| JP | 2000330066 | A * | 11/2000 |
| WO | WO-03/087596 | | 10/2003 |
| WO | WO-2004/003906 | | 1/2004 |

OTHER PUBLICATIONS

Hendriks, et al., "Stability of the Oil-Air Boundary in Fluid Dynamic Bearings of Hard Disk Drives. The Hitachi Problem from MPI 2005", (May 23, 2006),1-17.

Zhang, et al., "Design of High-Speed Magnetic Fluid Bearing Spindle Motor", *IEEE Transactions on Magnetics*, vol. 37, No. 4, Jul. 2001, 2647-2650.

* cited by examiner

600

START
↓
FABRICATING AT LEAST ONE CONTOURED REGION COMPRISING AT LEAST ONE DEFINED EDGE FOR ARRESTING THE DISPLACEMENT OF A LUBRICANT WITHIN A CAPILLARY BUFFER.
610
↓
END

US 8,194,347 B2

DESIGNED ROUGHNESS AND SURFACE TREATMENTS FOR CAPILLARY BUFFER OF FLUID DYNAMIC BEARINGS

TECHNICAL FIELD

Embodiments of the present invention are generally related to the field of direct access data storage devices.

BACKGROUND ART

Direct access storage devices (DASD), commonly known as hard drives or hard disk drives (HDDs), have become part of every day life, and as such, expectations and demands continually increase for greater speed for manipulating data and for holding larger amounts of data.

In order to improve the performance of hard disk drives, many of them are currently operated at higher rotation speeds than in the past. As a result, new methods and components have been implemented in order to ensure that the hard disk drives operate at optimal conditions. For example, Fluid Dynamic Bearings (FDB) have replaced conventional ball bearing assemblies in many hard disk drives due to their superiority with regard to vibration and generated noise. However, under some operating conditions, FDBs can create problems which were not encountered when ball bearing assemblies were more commonly used. Under some operating conditions, the loss of lubricant from FDBs can cause contamination of the hard disk drive and can degrade the performance of the FDB with respect to vibration and reduction of friction.

SUMMARY OF THE INVENTION

A contoured region is disposed within a capillary buffer of a Fluid Dynamic Bearing. In one embodiment, the contoured region comprises at least one defined edge for arresting the displacement of a lubricant within the capillary buffer.

BRIEF DESCRIPTION OF THE DRAWINGS

The accompanying drawings, which are incorporated in and form a part of this specification, illustrate embodiments of the presented technology and, together with the description, serve to explain the principles of the presented technology. Unless specifically noted, the drawings referred to in this description should be understood as not being drawn to scale.

DETAILED DESCRIPTION

Reference will now be made in detail to the alternative embodiments of the present technology. While some of the present technology will be described in conjunction with the alternative embodiments, it will be understood that they are not intended to limit the present technology to these embodiments. On the contrary, embodiments of the present technology are intended to cover alternatives, modifications and equivalents, which may be included within the spirit and scope of the embodiments as defined by the appended claims.

Furthermore, in the following detailed description, numerous specific details are set forth in order to provide a thorough understanding of embodiments of the present technology. However, it will be recognized by one of ordinary skill in the art that embodiments may be practiced without these specific details. In other instances, well known methods, procedures, components, and circuits have not been described in detail as not to unnecessarily obscure aspects of embodiments of the present technology.

Figure 1:
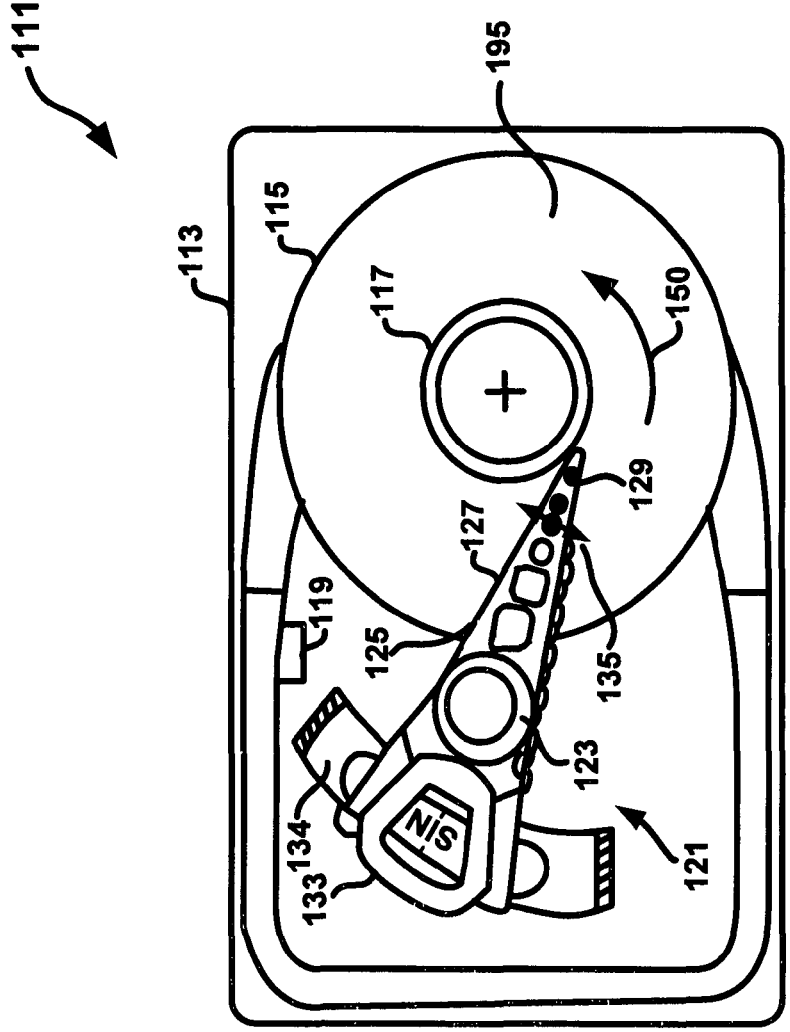
FIG. 1 is a schematic top plan view of an example hard disk drive in accordance with one embodiment of the present invention.

FIG. 1 shows a schematic drawing of one embodiment of an information storage system comprising a magnetic hard disk file or drive 111 for a computer system. Hard disk drive 111 has an outer housing or base 113 containing a disk pack having at least one media or magnetic disk 115. The disk pack (as represented by disk 115) defines an axis of rotation and a radial direction relative to the axis in which the disk pack is rotatable. A spindle motor assembly having a central shaft 117 operates as this axis and rotates disk 115, or disks of the disk pack, in the radial direction shown by arrow 150, relative to housing 113. An actuator 121 comprises a plurality of parallel actuator arms 125 (one shown) in the form of a comb that is movably or pivotally mounted to base/housing 113 about a pivot assembly 123. A controller 119 is also mounted to base 113 for selectively moving the comb of arms 125 relative to the disk pack (as represented by disk 115).

In the embodiment shown in FIG. 1, each arm 125 has extending from it at least one cantilevered integrated lead suspension (ILS) 129. The ILS 129 may be any form of lead suspension that can be used in a data access storage device, such as a hard disk drive (HDD). A slider (not shown) is usually bonded to the end of ILS 129, both of which are attached to suspension 127. Suspension 127, in one embodiment, is used as a pathway to provide an electrical connection to the slider. In one embodiment, portions of the slider are electrically isolated from ground, and in some embodiments, are also electrically isolated from suspension 127. The level of integration containing the slider, suspension, ILS, and read/write head (not shown) is called the Head Gimbal Assembly (HGA).

The ILS 129 has a spring-like quality, which biases or presses the air-bearing surface of the slider toward disk 115 to cause the slider to fly at a precise distance from disk 115. ILS 129 has a hinge area that provides for the spring-like quality, and a flexing interconnect that supports read and write traces and electrical connections through the hinge area. A voice coil 133, free to move within a conventional voice coil motor magnet assembly 134 (top pole not shown), is also mounted to actuator arms 125 opposite the head gimbal assemblies. Movement of the actuator 121 (indicated by arrows 135) by controller 119 causes the head gimbal assemblies to move along radial arcs across tracks on the surface 195 of disk 115 until the heads settle on their set target tracks. The head gimbal assemblies operate in a conventional manner and move in unison with one another, unless drive 111 uses multiple independent actuators (not shown) wherein the arms move independently of one another.

Figure 2A:
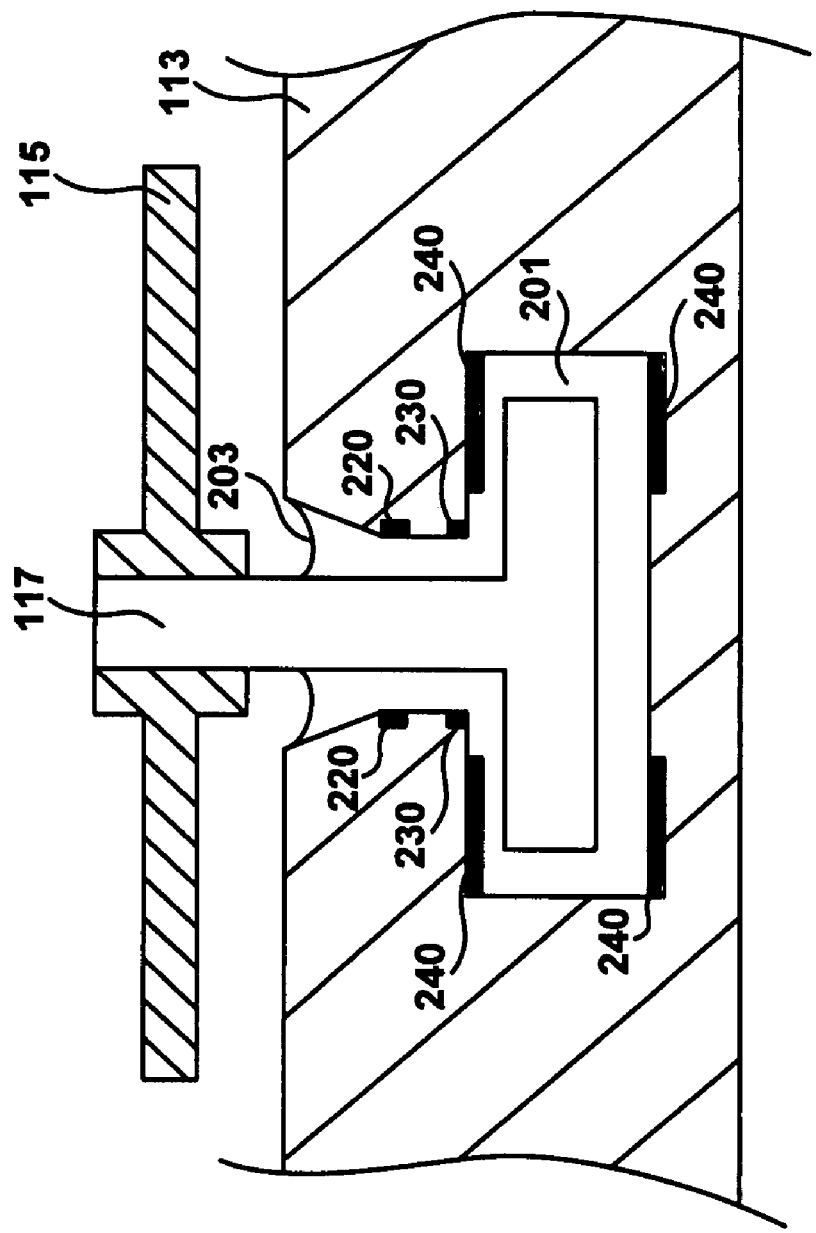
FIG. 2A is a side section view of a Fluid Dynamic Bearing in accordance with one embodiment of the present invention.

FIG. 2A is a cross sectional view of a Fluid Dynamic Bearing in accordance with one embodiment of the present invention. In FIG. 2A, disk pack 115 is shown disposed upon central shaft 117. The level of integration comprising disk pack 115 and central shaft 117 is also called the rotor and base 113 is called the stator. As shown in FIG. 2A, central shaft 117 extends into a cavity formed in base 113. In embodiments of the present invention, the space between base 113 and central shaft 117 is filled with a lubricant 201 in which central shaft 117 is suspended. In other words, central shaft 117 is held away from the sides of base 113 by lubricant 201. In operation, lubricant 201 also creates fluid dynamic pressures as central shaft 117 is rotated around an axis of rotation which serves to stabilize central shaft 117 within base 113 and to reduce friction between central shaft 117 and base 113. In other words, groove patterns 220 and 230 provide radial and angular (tilt) stability to the rotor. In the past, magnetic hard disk drives used ball bearings to reduce the friction between central shaft 117 and base 113. However, as central shaft 117 rotates, and particularly at higher rotation speeds, ball bearings can vibrate excessively, thus inducing non-repeatable run-out (NRRO). This causes a relatively large amount of vibration (e.g., approximately 1µ) in some instances. The use of ball bearings in magnetic hard disk drives has the additional disadvantage of being relatively noisy in operation.

Figure 2B:
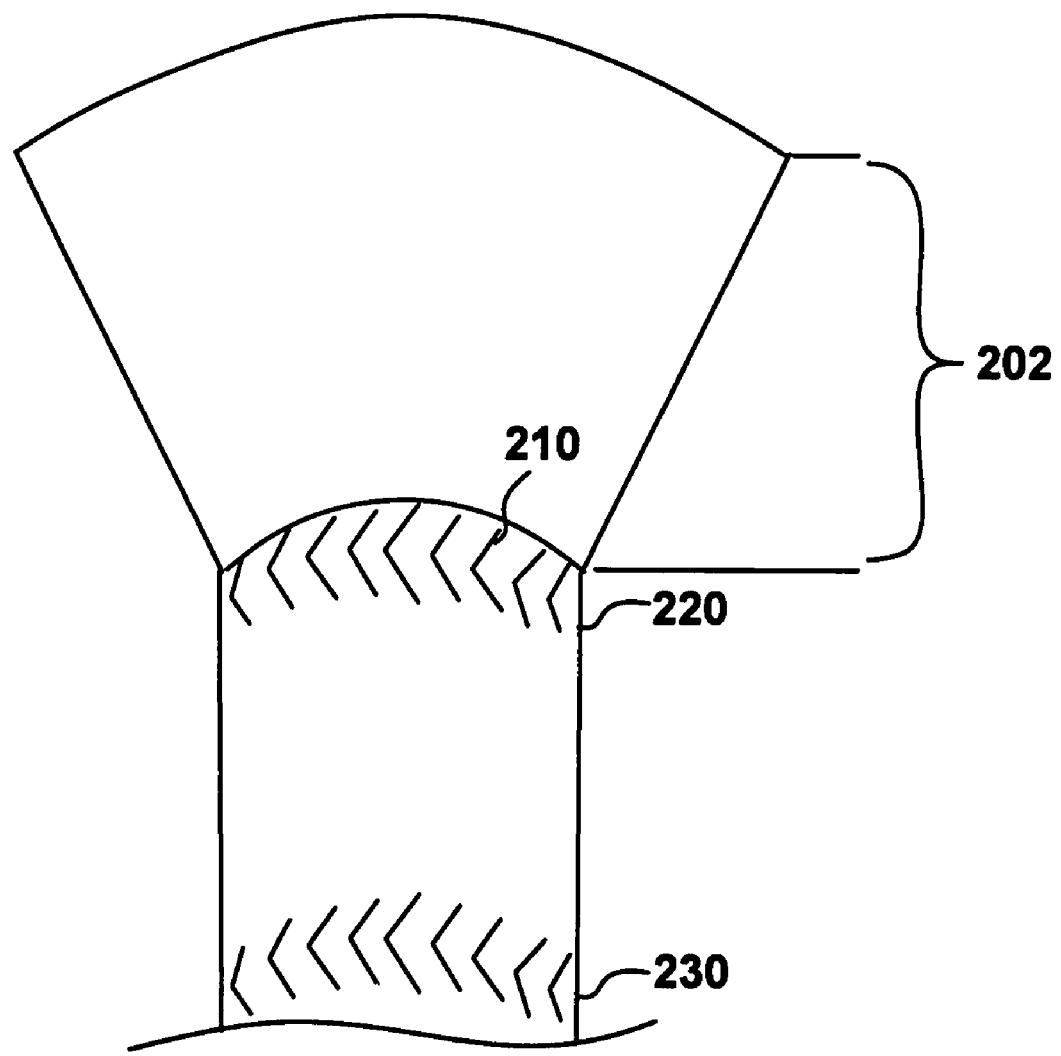
FIG. 2B is a side view of a portion of a Fluid Dynamic Bearing of a magnetic hard disk drive in accordance with one embodiment of the present invention.

As a result of the disadvantages listed above, most magnetic hard disk drives utilize FDBs. In many FDBs, regions of base 113 surrounding central shaft 117 are grooved. Referring now to FIG. 2B, the grooved regions of base 113 are shown. In FIG. 2B, central shaft 117 has been removed to show a plurality of grooves (e.g., 210) which are formed into the side of the cavity in which central shaft 117 is normally disposed. As shown in FIGS. 2A and 2B, there is a top grooved region 220 and a bottom grooved region 230 which surround central shaft 117. As shown in FIG. 2B, grooves 210 are V-shaped and top grooved region 220 and bottom grooved region 230 are frequently referred to as having a herringbone pattern.

In operation, as central shaft 117 rotates around its axis of rotation, grooves 210 cause a build-up of pressure in lubricant 201 in the region between central shaft 117 and top grooved region 220. Bottom grooved region 230 creates a second region in which there is a build-up of pressure in lubricant 201 between central shaft 117 and bottom grooved region 230. Thus, central shaft 117 is stabilized in an X/Y plane of movement. Additionally, base 113 typically has grooved regions 240 disposed above and below central shaft 117. Grooved regions 240 are also grooved as described above with reference to top grooved region 220 and bottom grooved region 230. In operation, as central shaft 117 is rotated around its axis of rotation, a build-up of pressure in lubricant 201 between the bottom of central shaft 117 and grooved regions 240, thus stabilizing central shaft 117 in a Z plane of movement. It is noted that the grooves (e.g., 210) comprising top grooved region 220, bottom grooved region 230, and grooved regions 240 may exhibit a profile other than a herringbone pattern. For example, grooves 210 may be straight grooves, or in a spiral shape as well.

Alternatively, rather than disposing grooves 210 within base 113, grooves 210 may be disposed upon central shaft 117 in regions corresponding with top grooved region 220, bottom grooved region 230, and grooved regions 240. The latter provide axial stability to the rotor.

Also shown in FIGS. 2A and 2B, is a flared region at the top of base 113 proximate to disk pack 115. This flared region is typically referred to as the capillary buffer 202. Capillary buffers are often used in Fluid Dynamic Bearings (FDBs) as a reservoir of lubricant 201 and as an overflow region to retain lubricant 201 when magnetic hard disk drive 111 is in operation.

Figure 3A:
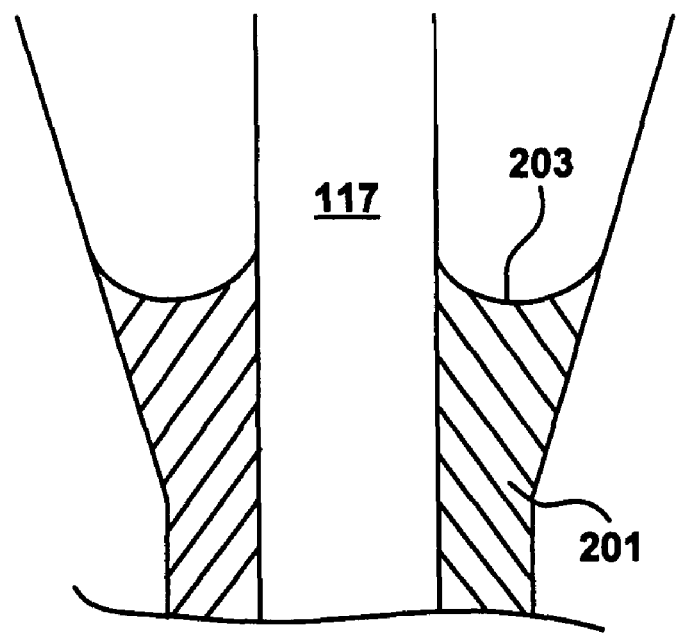
FIGS. 3A and 3B are cross sectional views showing the distortion of an Oil/Air Interface during the operation of a hard disk drive.
Figure 3B:
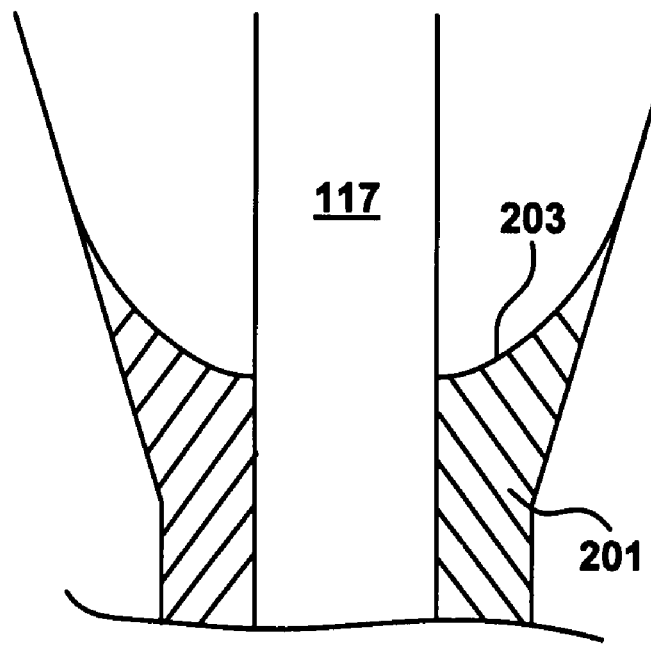

As shown in FIG. 2A, the top surface of lubricant 201 forms an Oil/Air Interface (OAI) 203. As shown in FIG. 3A, when central shaft 117 is not rotating, OAI 203 exhibits the shape of a meniscus which is formed by surface tension and contact angles of lubricant 201. However, as shown in FIG. 3B, as central shaft 117 rotates at higher speeds the shape of OAI 203 is distorted. More specifically, centrifugal force causes lubricant 201 to move outward from central shaft 117, causing it to move up the sides of capillary buffer 202. Up to a certain speed of rotation of central shaft 117, surface tension retains lubricant 201 within capillary buffer 202. In particular, the conical shape of capillary buffer 202 provides additional space to retain the distorted OAI during the operation of magnetic hard disk drive 111. As lubricant 201 is displaced up the sides of capillary buffer 202, the surface area of lubricant 201 increases which leads to increased surface tension. The increase in surface tension in turn tends to retain lubricant 201 within capillary buffer 202.

However, at some critical speed, the centrifugal force of central shaft 117 can cause lubricant 201 to become unstable and flow over the top of capillary buffer 202. In other words, OAI 203 is unstable at some critical speed. This is a problem because a typical magnetic hard disk drive (e.g., 111) does not have positive sealing at the top of capillary buffer 202. As a result, at some point lubricant 201 can fly out of capillary buffer 202 and into magnetic hard disk drive 111. This can lead to a depletion of lubricant 201 such that the operation of the Fluid Dynamic Bearing is degraded. Additionally, lubricant 201 can contaminate magnetic hard disk drive 111. For example, the read/write heads of a magnetic hard disk drive fly very close (e.g., approximately 10 nanometers (nm)) to the surface of respective disks 115 of disk pack 117. Thus, very small droplets of lubricant 201 can easily contaminate magnetic hard disk drive 117 if lubricant 201 is displaced from capillary buffer 202.

Figure 4A:
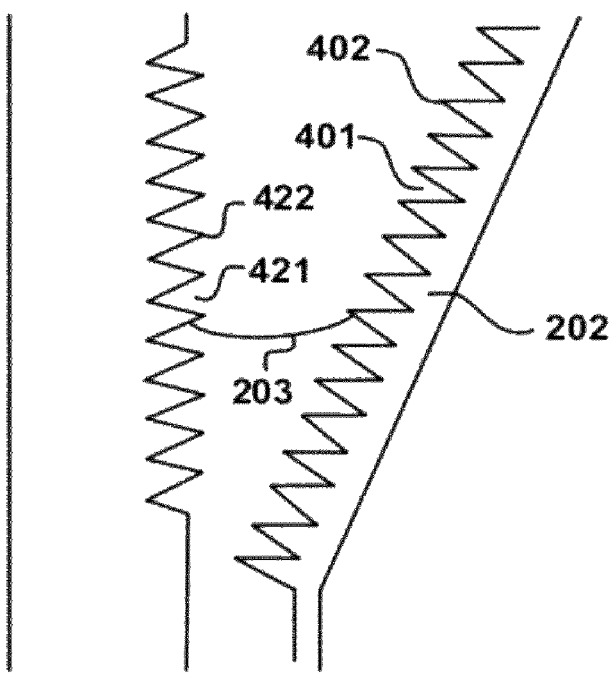
FIGS. 4A, 4B, 4C, and 4D are cross sectional views of a capillary buffer in accordance with embodiments of the present invention.

FIGS. 4A, 4B, 4C, and 4D are cross sectional views of a capillary buffer in accordance with embodiments of the present invention. In FIG. 4A, the walls comprising capillary buffer 202 have been contoured with at least one groove 401. As shown in FIGS. 4A, 4B, 4C, and 4D, capillary buffer 202 has been contoured with a plurality of grooves 401. In embodiments of the present invention, the edges of groove 401 exhibit a sharply defined edge 402 between successive grooves (e.g., 401a and 401b of FIG. 4B). In one embodiment, grooves 401 are machined into the surface of capillary buffer 202 axially to the axis of rotation of central shaft 117 during manufacture of base 113. However, it is noted that it is not required that grooves 401 be machined features in embodiments of the present invention. Additionally, grooves 401 can have a configuration other than concentric circles in embodiments of the present invention.

Figure 4B:
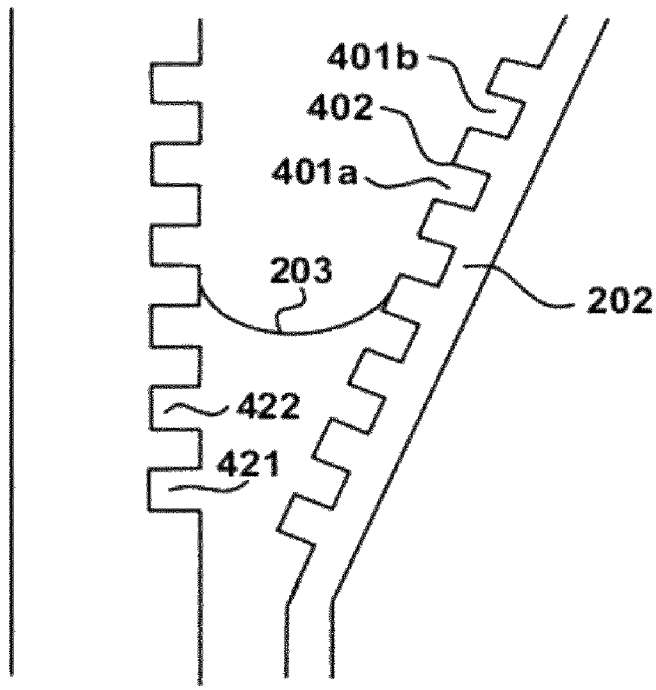
Figure 4C:
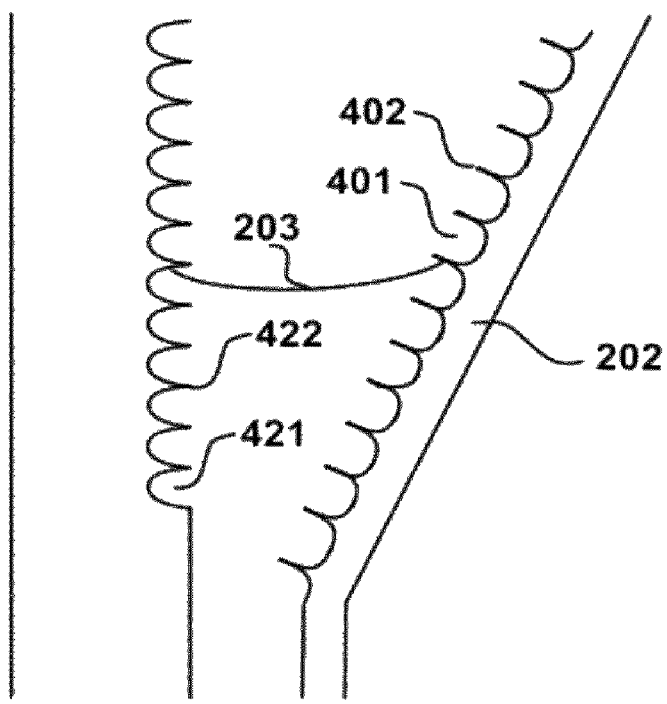

In one embodiment, as shown in FIGS. 4A, 4B, and 4C, central shaft 117 has also been contoured with at least one defined edge (e.g., 421). As shown in FIGS. 4A, 4B, and 4C, central shaft 117 has been contoured with a plurality of grooves 421. In embodiments of the present invention, the edges of groove 421 exhibit a sharply defined edge 422 between successive grooves. In one embodiment, grooves 421 are machined into the surface of central shaft 117 axially to its axis of rotation during the manufacture of central shaft 117. However, it is noted that it is not required that grooves 421 be machined features in embodiments of the present invention. Additionally, grooves 421 can have a configuration other than concentric circles in embodiments of the present invention. In one embodiment, capillary buffer 202 comprises grooves 401 alone. In another embodiment, capillary buffer 202 comprises grooves 421 alone. In another embodiment, capillary buffer 202 comprises grooves 401 and 421.

In operation, as OAI 203 is displaced upward along the sides of capillary buffer 202, its movement is arrested by each of the defined edges 402 and/or 422. More specifically, when lubricant 201 moves around defined edge 402 and/or 422, the necessity to move around the sharp angle causes a higher fluid pressure in lubricant 201 in that region. In other words, the capillary pressure keeps lubricant 201 from moving around defined edge 402 and/or 422 as readily as it can move up a non-contoured surface such as is shown in FIG. 3B. Thus, each of the defined edges 402 and/or 422 tends to arrest the displacement of lubricant 201 farther up the side of capillary buffer 202 and/or central shaft 117. In addition, the effective wetting angle of lubricant 201 on the walls of capillary buffer 202 and/or central shaft 117 is favorably affected due to the presence of grooves 401 and/or 421. In one embodiment of the present invention the meniscus of OAI 203 is actually lower in the region proximate to groove 401 than the region proximate to central shaft 117, if grooves 421 are not present, when magnetic hard disk drive 111 is in operation.

Figure 4D:
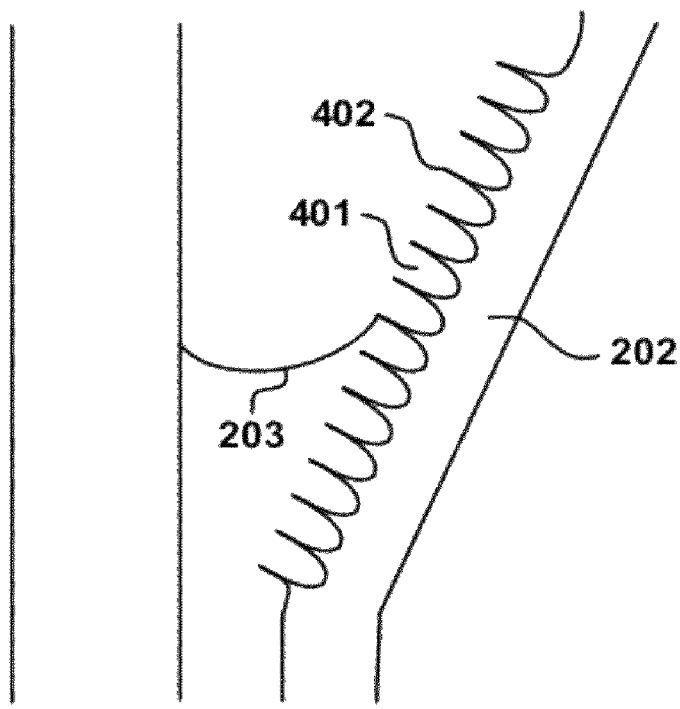

As shown in FIGS. 4A, 4B, 4C, and 4D, the shape of grooves 401 and 421 can exhibit a variety of shapes. In FIG. 4A, grooves 401 and 421 have a triangular or saw tooth cross section. In FIG. 4B, grooves 401 and 421 have a squared cross section. In FIGS. 4C and 4D, grooves 401 and 421 have a scalloped cross section. However, it is appreciated that other cross sections having a defined edge (e.g., 402 or 422) can be used in embodiments of the present invention.

In addition to retaining lubricant 201 within capillary buffer 202, grooves 401 and 421 also serve to increase the capacity of capillary buffer 202 to store lubricant 201 in embodiments of the present invention. For example, grooves 401 in FIG. 4D are cut deeper into the sides of base 113 in comparison with the grooves 401 shown in FIG. 4C. The additional depth of the grooves shown in FIG. 4D facilitate holding a greater amount of lubricant 201 within capillary buffer 202 in embodiments of the present invention. It is noted that the depth of grooves 421 can also be cut deeper into the sides of central shaft 117 in one embodiment.

In one embodiment, the material comprising capillary buffer 202 may be a porous material which further facilitates increasing the lubricant capacity of capillary buffer 202. Examples of porous materials used in accordance with embodiments of the present invention include, but are not limited to, bronze, or a sintered powdered metal (e.g., stainless steel). By increasing the holding capacity of capillary buffer 202 to hold lubricant 201, embodiments of the present invention are better able to prevent the depletion of lubricant from Fluid Dynamic Bearings than has been exhibited in conventional capillary buffers.

Figure 5:
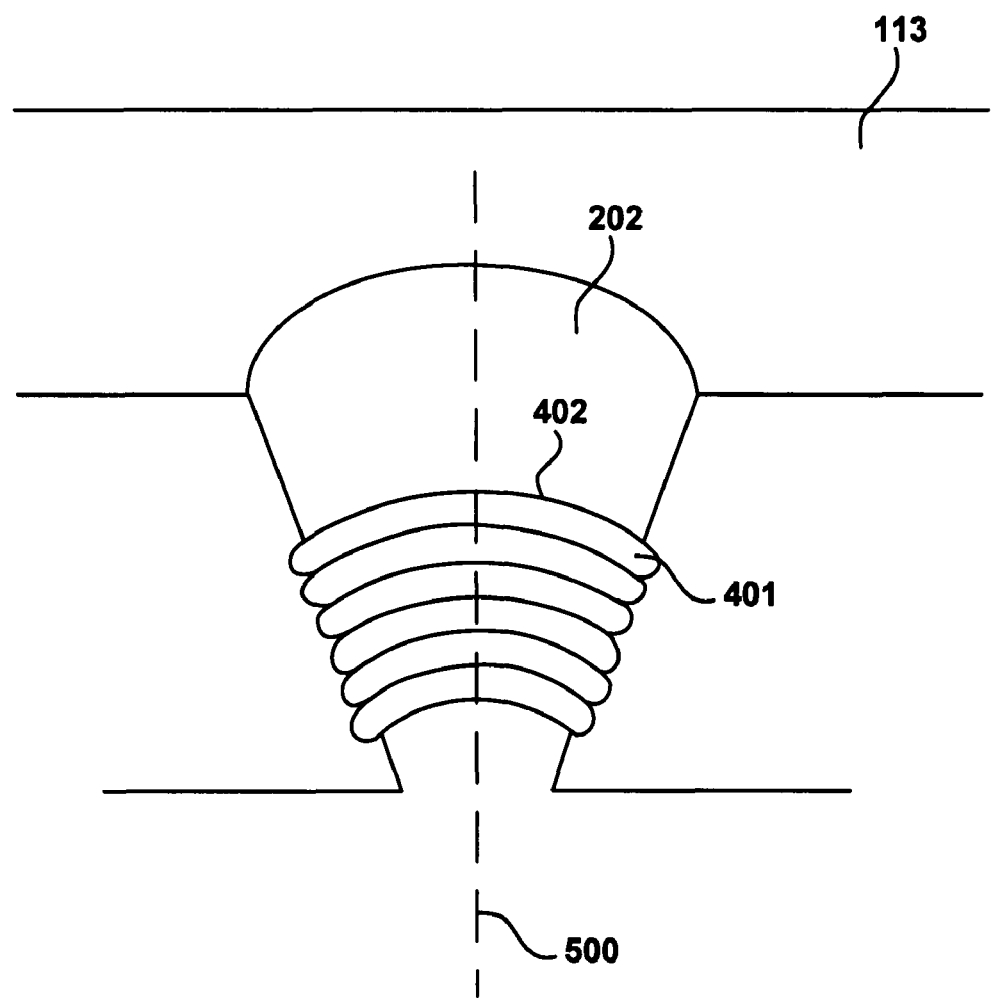
FIG. 5 is a perspective section view of a capillary buffer in accordance with embodiments of the present invention.

FIG. 5 is a perspective section view of a capillary buffer in accordance with embodiments of the present invention. As shown in FIG. 5, a plurality of grooves 401 is disposed within capillary buffer 202. In FIG. 5, the defined edges 402 are fabricated concurrent with the fabrication of grooves 401. As shown in FIG. 5, grooves 401 and defined edges 402 are disposed axially with respect to the axis of rotation 500 of central shaft 117 (not shown). Thus, grooves 401 and defined edges 402 comprise a plurality of concentric circular features within capillary buffer 202. It is noted that grooves 421 and defined edges 422 may also comprise a plurality of concentric circular features within capillary buffer 202 (e.g., upon central shaft 117) in one embodiment.

Figure 6:
FIG. 6 is a flowchart of a method for controlling lubricant displacement in a capillary buffer in accordance with embodiments of the present invention.

FIG. 6 is a flowchart of a method for controlling lubricant displacement in a capillary buffer in accordance with embodiments of the present invention. In block 610 of FIG. 6, at least one contoured region comprising at least one defined edge for arresting the displacement of said lubricant is fabricated within a capillary buffer. As discussed above, embodiments of the present invention utilize a contoured region within a capillary buffer (e.g., 202) to arrest the displacement of lubricant (e.g., 201) along the side walls of the capillary buffer. In embodiments of the present invention, the contoured region comprises at least one defined edge (e.g., 402) for arresting the displacement of the OAI (e.g., 203) in response to centrifugal force created when central shaft 117 is rotating around its axis of rotation.

The foregoing descriptions of example embodiments have been presented for purposes of illustration and description. They are not intended to be exhaustive or to limit the teaching to the precise forms disclosed. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A capillary buffer of a Fluid Dynamic Bearing, said capillary buffer comprising:
    a contoured region comprising a plurality of grooves disposed along at least one wall of said capillary buffer of said Fluid Dynamic Bearing, wherein the cross section of said plurality of grooves is a scalloped cross section, said plurality of grooves disposed on said at least one wall beginning at a point below an Oil/Air Interface (OAI) of a top surface of a lubricant and ending at a point above said OAI; and
    at least one defined edge between each of said plurality of grooves for arresting the displacement of said lubricant within said capillary buffer.

2. The capillary buffer as recited in claim 1 wherein the depth of said plurality of grooves is increased to increase the capacity of said capillary buffer to hold said lubricant.

3. The capillary buffer as recited in claim 1 wherein said contoured region is axially symmetrical with respect to an axis of rotation passing through said capillary buffer.

4. The capillary buffer as recited in claim 1 wherein the walls of said capillary buffer comprise a porous material.

5. The capillary buffer as recited in claim 4 wherein said porous material comprises a sintered metal powder.

6. A hard disk drive comprising:
    a housing;
    a disk pack coupled with a central shaft disposed within a Fluid Dynamic Bearing, said disk pack defining an axis of rotation and a radial direction relative to said axis; and
    a plurality of defined edges disposed along at least one wall of a capillary buffer portion of said Fluid Dynamic Bearing, wherein the cross section of said plurality of grooves is a scalloped cross section, said plurality of defined edges disposed axially with respect to an axis of rotation of said central shaft beginning at a point below an Oil/Air Interface (OAI) of a top surface of a lubricant and ending at a point above said OAI, said plurality of defined edges for arresting the displacement of said lubricant within said capillary buffer portion.

7. The hard disk drive as recited in claim 6 further comprising a plurality of grooves disposed between said plurality of defined edges.

8. The hard disk drive as recited in claim 7 wherein the depth of instances of said plurality of grooves is increased to increase the capacity of said capillary buffer portion to hold said lubricant.

9. The hard disk drive as recited in claim 6 wherein the walls of said capillary buffer portion comprise a porous material.

10. The hard disk drive as recited in claim 9 wherein said porous material comprises a sintered metal powder.

11. A method for controlling lubricant displacement in a capillary buffer, said method comprising:
    fabricating a contoured region comprising a plurality of grooves along at least one wall of said capillary buffer of a Fluid Dynamic Bearing, wherein the cross section of said plurality of grooves is a scalloped cross section, said plurality of grooves disposed on said at least one wall beginning at a point below an Oil/Air Interface (OAI) of a top surface of a lubricant and ending at a point above said OAI; and
    fabricating at least one defined edge between each of said plurality of grooves for arresting the displacement of said lubricant within said capillary buffer.

12. The method as recited in claim 11 further comprising:
    selecting the depth of said plurality of grooves to increase the capacity of said capillary buffer to hold said lubricant.

13. The method as recited in claim 11 further comprising:
    disposing said contoured region axially with respect to an axis of rotation passing through said capillary buffer.

14. The method as recited in claim 11 further comprising:
    fabricating the walls of said capillary buffer using a porous material.

15. The method as recited in claim 14 further comprising:
    using a sintered metal powder to fabricate the walls of said capillary buffer.

* * * * *